United States Patent
Lv et al.

(10) Patent No.: US 10,652,360 B2
(45) Date of Patent: May 12, 2020

(54) ACCESS SCHEDULING METHOD AND APPARATUS FOR TERMINAL, AND COMPUTER STORAGE MEDIUM

(71) Applicant: TENCENT TECHNOLOGY (SHENZHEN) COMPANY LIMITED, Shenzhen (CN)

(72) Inventors: Yangyang Lv, Shenzhen (CN); Yingpai Song, Shenzhen (CN); Zedong Zheng, Shenzhen (CN); Yang Yang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 102 days.

(21) Appl. No.: 16/047,402

(22) Filed: Jul. 27, 2018

(65) Prior Publication Data
US 2018/0375957 A1 Dec. 27, 2018

Related U.S. Application Data

(63) Continuation of application No. PCT/CN2017/082938, filed on May 3, 2017.

(30) Foreign Application Priority Data

May 9, 2016 (CN) .......................... 2016 1 0301528

(51) Int. Cl.
*H04L 29/08* (2006.01)
*H04W 16/10* (2009.01)
(Continued)

(52) U.S. Cl.
CPC .......... *H04L 67/322* (2013.01); *H04L 67/101* (2013.01); *H04W 4/08* (2013.01);
(Continued)

(58) Field of Classification Search
CPC ...... H04L 67/322; H04L 67/101; H04W 4/08; H04W 16/10; H04W 72/121; H04W 72/1226
See application file for complete search history.

(56) References Cited

U.S. PATENT DOCUMENTS

| | | | |
|---|---|---|---|
| 2010/0041411 A1* | 2/2010 | Mallik | H04W 88/08 455/450 |
| 2010/0042716 A1* | 2/2010 | Farajidana | H04W 16/10 709/224 |
| 2017/0188204 A1* | 6/2017 | Kela | H04W 72/121 |

FOREIGN PATENT DOCUMENTS

| | | |
|---|---|---|
| CN | 101583194 A | 11/2009 |
| CN | 102124813 A | 7/2011 |

(Continued)

OTHER PUBLICATIONS

The State Intellectual Property Office of the People's Republic of China (SIPO) Office Action 1 for 201610301528.1 dated May 7, 2019 9 Pages (including translation).

(Continued)

*Primary Examiner* — Ian N Moore
*Assistant Examiner* — Brian T Le
(74) *Attorney, Agent, or Firm* — Anova Law Group, PLLC

(57) ABSTRACT

A terminal access scheduling method is provided. The method is applied to a scheduling server and includes performing grouping on terminals that need access to obtain multiple terminal groups; and performing cluster division on machines providing resources for access to obtain multiple machine clusters. The method also includes obtaining resource demands of the terminal groups, available resources of the machine clusters, and access quality between the terminal groups and the machine clusters; obtaining coverage ratios of the machine clusters to the (Continued)

terminal groups according to the resource demands of the terminal groups, the available resources of the machine clusters, and the access quality; and performing access scheduling for the terminals according to the coverage ratios.

20 Claims, 3 Drawing Sheets

(51) Int. Cl.
     *H04W 72/12*     (2009.01)
     *H04W 4/08*     (2009.01)

(52) U.S. Cl.
     CPC ......... *H04W 16/10* (2013.01); *H04W 72/121* (2013.01); *H04W 72/1226* (2013.01)

(56) References Cited

FOREIGN PATENT DOCUMENTS

| | | |
|---|---|---|
| CN | 102132595 A | 7/2011 |
| CN | 103841126 A | 6/2014 |
| CN | 104461740 A | 3/2015 |
| WO | 2016037660 A1 | 3/2016 |

OTHER PUBLICATIONS

The World Intellectual Property Organization (WIPO) International Search Report for PCT/CN2017/082938 dated Jul. 27, 2017 5 Pages (including translation).

\* cited by examiner

ACCESS SCHEDULING METHOD AND APPARATUS FOR TERMINAL, AND COMPUTER STORAGE MEDIUM

RELATED APPLICATIONS

This application is a continuation application of PCT Patent Application No. PCT/CN2017/082938, filed on May 3, 2017, which claims priority to Chinese Patent Application No. 201610301528.1, filed on May 9, 2016, content of all of which is incorporated by reference in its entirety.

FIELD OF TECHNOLOGY

The present disclosure relates to the field of communications technologies and, in particular, to a terminal access scheduling method and apparatus, and a computer storage medium.

BACKGROUND

For a communications system with a client/server (C/S) architecture, terminal access scheduling is a very important part, and the access scheduling is control logic for designating which servers to be accessed by a terminal and provide services to the terminal.

In existing technology, a common access scheduling solution usually performs scheduling based on location. Specifically, geographic location information of a terminal is obtained (obtained by using an IP or obtained directly), and then a corresponding machine (e.g., a server) is allocated according to the geographic location information to provide services to the terminal, that is, a corresponding machine is accessed by the terminal, to provide services to the terminal. For example, after the geographic location information of the terminal is obtained, a machine close to or closest to the geographic location of the terminal is allocated to provide services to the terminal. Access scheduling in this case may be referred to as proximity access scheduling. If an IP address of the terminal is obtained in this solution, a preset IP database needs to be searched for a geographic location corresponding to the IP address, and then a machine close to or closest to the geographic location of the terminal is allocated to provide services to the terminal.

However, according to the present disclosure, in the existing access scheduling solution, access scheduling is performed only based on the geographic location of the terminal, and the obtained IP database, IP addresses, or geographic location information may be inaccurate. Thus, such access scheduling of the terminal has relatively low accuracy, especially when dealing with massive-scale services. The disclosed methods and systems are directed to solve one or more problems set forth above and other problems.

SUMMARY

Embodiments of the present disclosure provide a terminal access scheduling method and apparatus and a computer storage medium, so as to improve accuracy of terminal access scheduling.

According to one aspect of the present disclosure, a terminal access scheduling method is provided. The method includes performing, by a scheduling server, grouping on terminals that need access to obtain multiple terminal groups; and performing, by the scheduling server, cluster division on machines providing resources for access to obtain multiple machine clusters. The method also includes obtaining, by the scheduling server, resource demands of the terminal groups, available resources of the machine clusters, and access quality between the terminal groups and the machine clusters; obtaining coverage ratios of the machine clusters according to the terminal groups according to the resource demands of the terminal groups, the available resources of the machine clusters, and the access quality; and performing, by the scheduling server, access scheduling for the terminals according to the coverage ratios.

According to another aspect of the present disclosure, a terminal access scheduling system is provided. The system includes a memory storing computer program instructions; and at least one processor coupled to the memory. When executing the computer program instructions, the processor is configured to perform: performing grouping on terminals that need access, to obtain multiple terminal groups; performing cluster division on machines providing resources for access, to obtain multiple machine clusters; obtaining resource demands of the terminal groups, available resources of the machine clusters, and access quality between the terminal groups and the machine clusters; obtaining coverage ratios of the machine clusters to the terminal groups according to the resource demands of the terminal groups, the available resources of the machine clusters, and the access quality; and performing access scheduling for the terminals according to the coverage ratios.

According to another aspect of the present disclosure, a non-transitory computer-readable storage medium is provided. The storage medium stores computer program instructions executable by at least one processor. The computer program instructions cause the at least one processor to perform: performing grouping on terminals that need access, to obtain multiple terminal groups; performing cluster division on machines providing resources for access, to obtain multiple machine clusters; obtaining resource demands of the terminal groups, available resources of the machine clusters, and access quality between the terminal groups and the machine clusters; obtaining coverage ratios of the machine clusters to the terminal groups according to the resource demands of the terminal groups, the available resources of the machine clusters, and the access quality; and performing access scheduling for the terminals according to the coverage ratios.

Other aspects of the present disclosure can be understood by those skilled in the art in light of the description, the claims, and the drawings of the present disclosure.

BRIEF DESCRIPTION OF THE DRAWINGS

To more explicitly explain technical solutions in embodiments of the present disclosure, accompanying drawings for describing the embodiments are briefly introduced in the following. Apparently, the following accompanying drawings are only some embodiments of the present disclosure, and a person skilled in the art can derive other drawings from the accompanying drawings without creative effort.

DETAILED DESCRIPTION

The following describes the technical solutions in the embodiments of the present disclosure with reference to the accompanying drawings. Obviously, the described embodiments are only some embodiments instead of all embodiments of the present disclosure. Other embodiments obtained by a person of ordinary skill in the art based on the embodiments of the present disclosure without any creative effort fall within the protection scope of the present disclosure.

The embodiments of the present disclosure provide a terminal access scheduling method and apparatus. In the embodiments, descriptions are made from the perspective of an access scheduling apparatus. The access scheduling apparatus may be specifically integrated in a server or another device requiring access scheduling.

A terminal access scheduling method includes: performing grouping on terminals to obtain multiple terminal groups; performing cluster division on machines providing resources to obtain multiple machine clusters; then obtaining resource demands of the terminal groups, available resources of the machine clusters, and access quality between the terminal groups and the machine clusters; obtaining coverage ratios of the machine clusters to the terminal groups according to the resource demands of the terminal groups, the available resources of the machine clusters, and the access quality; and performing access scheduling on the terminals according to the ratios.

Figure 1:
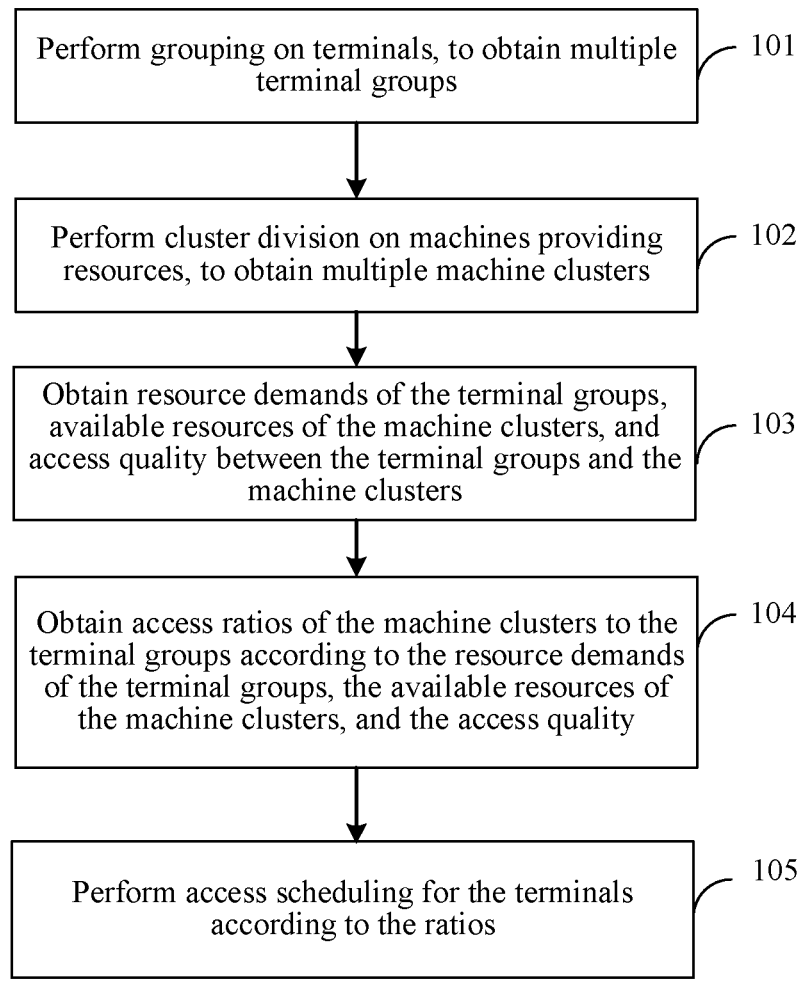
FIG. 1 is a flowchart of a terminal access scheduling method according to an embodiment of the present disclosure.

As shown in FIG. 1, a specific process of the terminal access scheduling method may include the followings.

Step 101: Performing grouping on terminals to obtain multiple terminal groups.

There may be multiple ways to group the terminals. For example, grouping may be performed based on geographic locations of the terminals. That is, the performing grouping on terminals may include: performing grouping on the terminals according to geographic locations of the terminals.

The geographic locations of the terminals may include current geographic locations of the terminals or network-registered home locations of the terminals. For example, grouping may be performed according to areas (regions, cities, provinces, nations, and the like) in which the terminals are located or that are registered by a network. Specifically, terminals having the same areas in which the terminals are located or that are registered by a network are classified into the same terminal group.

For another example, in one embodiment, grouping may be performed based on network addresses (such as IP addresses) of the terminals. That is, the performing grouping on terminals may include: performing grouping on the terminals according to network addresses of the terminals.

For example, grouping may be performed according to IP address segments, that is, according to the network addresses of the terminal. The performing grouping on terminals may include: performing grouping on the terminals according to IP address segments to which IP addresses of the terminals belong. For example, terminals whose IP addresses belong to the same preset IP address segments are divided into a same terminal group.

To be applicable to scheduling of various scenarios to satisfy personalized demands, a member in a terminal group in one embodiment may be a terminal or a combination of terminals, which may be specifically set according to actual demands.

In one embodiment, the terminal may be a device located at the outermost of a computer network in the network. That is, the terminal may be user equipment. For example, the terminal may be a personal computer, a mobile phone, a tablet computer, or other user equipment.

Step 102: Performing cluster division on machines providing resources to obtain multiple machine clusters. The machines providing sources may be servers or other devices capable of providing resources.

In one embodiment, multiple ways may be used to divide the machines. For example, division may be performed according to geographic locations of the machines. That is, the performing cluster division on machines providing resources may include: performing cluster division on the machines according to geographic locations of the machines providing resources.

Specifically, cluster division may be performed according to areas (regions, cities, provinces, nations, and the like) in which the machines are located. For examples, machines located in a province are divided into a same machine cluster.

Further, the order of step 101 and step 102 is not limited. For example, step 101 may be performed before step 102, or step 102 may be performed before step 101. Certainly, step 101 and step 102 may be simultaneously performed.

Step 103: Obtaining resource demands of the terminal groups, available resources of the machine clusters, and access quality between the terminal groups and the machine clusters.

There are multiple ways for obtaining the resource demands of the terminal groups. For example, the resource demands of the terminal groups may be obtained based on historical request amounts of the terminal groups. That is, the obtaining resource demands of the terminal groups may include: obtaining historical request amounts of the terminals in the terminal groups; obtaining resource demands of the terminals in the terminal groups according to the historical request amounts; and obtaining the resource demands of the terminal groups according to the resource demands of the terminals in the terminal groups.

For example, for a group having ten terminals, a historical request amount of each terminal may be obtained, and then the historical request amount of each terminal is analyzed to obtain a resource demand of each terminal. Resources demands of the ten terminals are added to obtain a resource demand of the group.

For another example, in one embodiment, the resource demands of the terminal groups may be obtained in a manner of supervisor evaluation. That is, the obtaining resource demands of the terminal groups may include: receiving the resource demands that are inputted by a user and that are of the terminal groups.

Similarly, there may be multiple ways for obtaining the available resources of the machine clusters in one embodiment. For example, the available resources of the machine clusters may be obtained in a manner of a stress test. Specifically, a stress test is performed on the machines in the machine clusters to obtain available resources of the machines, and then the available resources of the machine clusters are obtained according to the available resources of the machines in the machine clusters. In an actual test, to improve the obtaining speed and access scheduling efficiency, a stress test may be performed based on types of the machines, and then the available resources of the machine clusters may be obtained according to the number of different types of machines. That is, a process of obtaining the available resources of the machine clusters may include: performing a stress test on different types of machines in the machine clusters to obtain available resources of the different types of machines; and obtaining the available resources of the machine clusters according to the available resources of the different types of machines and the number of the different types of machines.

For example, when a machine cluster includes: three machines b, four machines c, and five machines f, a stress test may be first performed on one machine b, one machine c, and one machine f in one embodiment, to obtain an available resource amount b1 of the machine b, an available resource amount c1 of the machine c, an available resource amount f1 of the machine f. Then, the available resource amount b1 is multiplied by the number 3 of the machines b, the available resource amount c1 is multiplied by the number 4 of the machines c, and the available resource amount f1 is multiplied by the number 5 of the machines f. Finally, these products are added to obtain an available resource amount of the machine cluster. That is, the available resource amount of the machine cluster=b1×3+c1×4+f1×5.

In one embodiment, in addition to using the stress test to obtain the available resource amount, the available resource amount may be obtained based on historical operation information of the machines. That is, a process of obtaining the available resources of the machine clusters may include: obtaining available resources of the machines according to historical operation information of machines in the machine clusters; and obtaining the available resources of the machine clusters according to the available resources of the machines in the machine clusters.

The historical operation information may include: at least one of historical resource consumption information and a historical service handling capacity.

In an actual application, to improve the resource obtaining speed and improve access scheduling efficiency, in one embodiment, the available resources of the machine clusters may be obtained based on types and the number of the machines, including: obtaining available resources of different types of machines according to historical operation information of the different types of machines in the machine clusters; and obtaining the available resources of the machine clusters according to the available resources of the different types of machines and the number of the different types of machines.

In one embodiment, the access quality between the terminal groups and the machine clusters may be network service quality from the terminal groups to the machine clusters. Network service quality (that is, access quality) between the terminals and the machines may be obtained according to at least one of network performance parameters between the terminals and the machines, historical operation information between the terminals and the machines, and physical distances between the terminals and the machines, network addresses of the terminals, and network topology maps of network systems to which the terminals and the machines belong. The network performance parameters may include: network delay, a packet loss rate, delay jitter, and the like.

Step 104: Obtaining coverage ratios of the machine clusters to the terminal groups according to the resource demands of the terminal groups, the available resources of the machine clusters, and the access quality.

The coverage ratios of the machine clusters to the terminal groups are percentages of resources provided by the machine clusters to the terminal groups to the resource demands of the terminal groups. For example, a machine cluster 1 covers 30% of a terminal group 1, which means that resources provided by the machine cluster 1 to the terminal group 1 occupies 30% of the resource demand of the terminal group 1. The machine cluster 1 covers 50% of a terminal group 2, which means that resources provided by the machine cluster 1 to the terminal group 2 occupies 50% of the resource demand of the terminal group 2. The ratio may be represented by using $n_{ij}$, and $n_{ij}$ represents a coverage ratio of a machine cluster j to a terminal group i, and i and j are both positive integers greater than 1.

In one embodiment, there are multiple ways for obtaining the coverage ratios of the machine clusters to the terminal groups according to the resource demands, the available resources, and the access quality. For example, that a sum of the resource demands of the terminal groups for machine clusters is less than the available resources of the machine clusters is used as a limiting-condition, and then the coverage ratios of the machine clusters to the terminal groups may be obtained according to the limiting-condition and the access quality between the terminal groups and the machine clusters.

That is, the obtaining coverage ratios of the machine clusters to the terminal groups according to the resource demands of the terminal groups, the available resources of the machine clusters, and the access quality may include: obtaining the coverage ratios of the machine clusters to the terminal groups according to a preset resource limiting-condition and the access quality between the terminal groups and the machine clusters.

Further, the preset resource limiting-condition includes: a sum of the resource demands of the terminal groups for the machine clusters is less than or equal to the available resources of the machine clusters, and the sum of the resource demands is obtained according to the resource demands of the terminal groups and the to-be-obtained ratios.

In one embodiment, the sum of the resource demands of the terminal groups for the machine clusters is a sum of resources that the machine clusters need to provide to all the terminal groups. For example, for the machine cluster 1, assuming that there are m terminal groups, a sum of resource demands of the terminal groups for the machine cluster 1 may be a sum of a resource that the machine cluster 1 needs to provide to the terminal group 1, a resource that the machine cluster 1 needs to provide to the terminal group 2, . . . and a resource that the machine cluster 1 needs to provide to a terminal group m. The sum of the resource demands of the terminal groups for the machine clusters may be obtained according to the resource demands of the terminal groups and the coverage ratios of the machine clusters to the terminal groups.

For example, the sum of resource demands of the terminal groups for the machine cluster 1 may be obtained according to a resource demand u1 of the terminal group 1 and a coverage ratio $n_{11}$ of the machine cluster 1 to the terminal group 1, a resource demand u2 of the terminal group 2 and a coverage ratio $n_{21}$ of the machine cluster 1 to the terminal group 2, . . . , and a resource demand um of the terminal group m and a coverage ratio $n_{m1}$ of the machine cluster 1 to the terminal group m. Specifically, the sum of resource demands of the terminal groups for the machine a1=u1×$n_{11}$+u2×$n_{21}$+ . . . +um×$n_{m1}$, where m and n are positive integers both greater than 1.

Specifically, a resource demand set, an available resource set, and an access quality set may be obtained. The resource demand set includes the resource demands of the multiple terminal groups, the available resource set includes the available resources of the multiple machine clusters, and the access quality set includes the access quality between the multiple terminal groups and the multiple machine clusters. Then, a ratio set is obtained according to a preset quality limiting-condition, the access quality set, and the preset resource limiting-condition. The ratio set includes the coverage ratios of the multiple machine clusters to the multiple terminal groups. The preset resource limiting-condition includes: the sum of the resource demands of the terminal groups to the machine clusters is less than the available resources of the machine clusters.

For example, assuming that there are m terminal groups and n machine clusters, a resource demand u of each terminal group may be obtained to obtain a resource demand set U. U includes u1, u2, u3, . . . ui, . . . um, where ui represents the size of a resource demand of a terminal group i, and i is less than m. An available resource a of each machine cluster is obtained to obtain an available resource set A. A includes a1, a2, a3, . . . aj, . . . an, where aj represents a size of an available resource of a machine cluster j, and j is less than n. Access quality d between each terminal group and each machine cluster is obtained, so as to obtain an access quality set D. D includes: $d_{11}$, $d_{12}$, $d_{13}$, . . . $d_{1n}$, $d_{21}$, $d_{22}$, . . . $d_{2n}$, . . . , $d_{m1}$, $d_{m2}$, . . . , $d_{mn}$, where $d_{ij}$ represents access quality between the terminal group i and the machine cluster j. Assuming that a to-be-obtained ratio is $n_{ij}$, which represents a coverage ratio of the machine cluster j to the terminal group i, in this case, the preset resource limiting-condition includes: Qi≤ai, where Qi represents a sum of resource demands of the terminal groups to the machine cluster i, and Qi=u1×$n_{1i}$+u2+$n_{2i}$+, . . . +um×$n_{mi}$, and then $n_{ij}$ is obtained according to the preset resource limiting-condition and the access quality set D, to obtain a ratio set N, N including: $n_{11}$, $n_{12}$, $n_{13}$, . . . $n_{1n}$, $n_{21}$, $n_{22}$, . . . $n_{2n}$, . . . , $n_{m1}$, $n_{m2}$, . . . , $n_{mn}$.

In an implementation, to improve the resource utilization rate of the system and business service quality, in one embodiment, the ratio when a sum of the access quality in the access quality set is the maximum may be obtained. That is, that the sum of the access quality between the terminal groups and the machine clusters is the maximum is used by default as optimal scheduling. In this case, the obtaining the coverage ratios of the machine clusters to the terminal groups according to a preset resource limiting-condition and the access quality between the terminal groups and the machine clusters may include: obtaining a ratio set according to a preset quality limiting-condition, an access quality set, and the preset resource limiting-condition, where the access quality set includes access quality between the multiple terminal groups and the multiple machine clusters, and the ratio set includes the coverage ratios of the machine clusters to the terminal groups. The preset quality limiting-condition includes: the sum of the access quality in the access quality set is the maximum.

For example, when the sum of access quality $d_{ij}$ in the access quality set D is the maximum, $n_{ij}$ is obtained according to the preset resource limiting-condition and the access quality set D, to obtain the ratio set N.

In an actual application, to conveniently and quickly obtain the coverage ratios of the machine clusters to the terminals, the ratio set may be calculated in a matrix operation manner. That is, obtaining of the coverage ratio set of the machine clusters to the terminals is converted into a problem of solving a matrix operation. For example, a corresponding matrix may be created according to the access quality set, and a corresponding weight matrix is obtained according to a preset quality limiting-condition, the matrix, and the preset resource limiting-condition. A matrix element in the weight matrix represents the coverage ratios of the machine clusters to the terminal groups. That is, the obtaining a ratio set according to a preset quality limiting-condition, an access quality set, and the preset resource limiting-condition may include: creating a corresponding quality matrix according to the access quality set, where a matrix element in the quality matrix represents the access quality between the terminal groups and the machine clusters; and obtaining a corresponding weight matrix under the preset quality limiting-condition according to the quality matrix and the preset resource limiting-condition, where a matrix element in the weight matrix represents the coverage ratios of the machine clusters to the terminal groups. In this case, the following step 105 of performing access scheduling on the terminals according to the ratios may include: performing access scheduling on the terminals according to the weight matrix.

For example, a corresponding resource demand matrix $U_m$ is created according to the resource demand set U and is also referred to as a user vector $U_m$ ($u_i$ represents the size of the resource demand of the terminal group i):

$$U_m = [U_1, U_2, \ldots U_m].$$

A corresponding resource demand matrix $A_n$ is created according to the available resource set A and is also referred to as a resource vector $A_n$ ($a_j$ represents the size of the available resource of the machine cluster j):

$$A_n = [a_1, a_2, \ldots a_n].$$

A corresponding access quality matrix $D_{m \times n}$ is created according to the access quality set and may also be referred to as an access quality vector $D_{m \times n}$ ($d_{ij}$ represents the access quality between the terminal group i and the machine cluster j):

$$D_{m \times n} = \begin{bmatrix} d_{1,1} & d_{1,2} & \ldots & d_{1,n} \\ d_{2,1} & \ldots & \ldots & \vdots \\ \vdots & \ldots & \ldots & \vdots \\ d_{m,1} & \ldots & \ldots & d_{m,n} \end{bmatrix},$$

where $d_{ij}$ may be a logic distance between the terminal i and the machine cluster j, the logic distance represents the access quality between the terminal group i and the machine cluster j, a longer logic distance represents greater (that is, better) access quality, and a shorter logic distance represents smaller (that is, worse) access quality.

It is assumed that a to-be-solved weight matrix is $N_{m \times b}$, $n_{ij}$ representing the coverage ratio of the machine cluster j to the terminal group i. To ensure that an allocated resource does not exceed the available resource, the resource limiting-condition may be added, and the resource limiting-condition includes: for each machine cluster, the sum of resource demands of the terminal groups for the machine cluster is less than or equal to an available resource of the machine cluster, that is, $U_m \times N_{m \times n} \leq A_n$.

To improve business service quality and ensure reasonableness of access scheduling, in one embodiment, that the sum of the access quality between the terminal groups and the machine clusters is the maximum may be used as optimal scheduling. For example, when $d_{ij}$ may be the logic distance between the terminal i and the machine cluster j, that the sum of logic distances is the minimum is used as optimal scheduling. That is, a constraint that the sum of the access quality between the terminal groups and the machine clusters is the maximum is added when $N_{m \times n}$ is calculated. That the sum of the access quality between the terminal groups and the machine clusters is the maximum may be represented by the access quality matrix $D_{m \times n}$ and the to-be-obtained weight matrix $N_{m \times n}$. For example, that the sum of the access quality is the maximum may be represented when $w=|D_{m \times n} \times N_{m \times n}^T|$ is the minimum or the maximum. Specifically, when larger $d_{ij}$ represents greater (that is, better) access quality, the preset quality limiting-condition may be that $w=|D_{m \times n} \times N_{m \times n}^T|$ is the maximum; when larger $d_{ij}$ represents smaller (that is, worse) access quality, the preset quality limiting-condition may be that $w=|D_{m \times n} \times N_{m \times n}^T|$ is the minimum.

After the access quality vector $D_{m \times n}$, the resource limiting-condition $U_m \times N_{m \times n} \leq A_n$, and the constraint that $w=|D_{m \times n} \times N_{m \times n}^T|$ is the maximum or the minimum are obtained, the weight matrix $N_{m \times n}$ when $w=|D_{m \times n} \times N_{m \times n}^T|$ is the maximum or the minimum may be solved. That is, the coverage ratios of the machine clusters to the terminal groups may be obtained.

Step 105: Performing access scheduling on the terminals according to the coverage ratios.

In one embodiment, when the ratio set is obtained in step 104, access scheduling may be performed on the terminals according to the ratio set.

Specifically, the performing access scheduling on the terminals according to the ratios may include: determining, according to the ratios, target machine clusters to which the terminal groups access; and determining from the target machine clusters target machines to which the terminals in the terminal groups need to access.

For example, a target machine cluster to which the terminal group 1 may be obtained according to the coverage ratio $n_{11}$ of the machine cluster 1 to the terminal group 1, the coverage ratio $n_{12}$ of the machine cluster 2 to the terminal group 1, . . . the coverage ratio $n_{1n}$ of a machine cluster n to the terminal group 1.

In one embodiment, an operation may be performed on the ratios by using a preset algorithm, to obtain an operation result, and the target machine clusters to which the terminal groups access are determined according to the operation result. The preset algorithm may be set according actual demands. For example, the preset algorithm may be a weighting algorithm.

In an implementation, to satisfy personalized operation demands, in one embodiment, the resource demands, the available resources, and the access quality may also be adjusted. Specifically, to reduce the pressure of the machine clusters and improve business service quality, it is usually expected to reserve resources. That is, it is not expected that resource utilization rates of the machine clusters are 100%. For another example, to prevent resources from being wasted and improve the resource utilization rate, it is expected that resource utilization rates of some machine clusters may be higher. For example, an oversea machine cluster only utilizes 60% of resources, which is wasteful, and is expected to utilize 90%. In this case, in one embodiment, the available resources of the machine clusters may be processed by using the resource utilization rates.

That is, the obtaining coverage ratios of the machine clusters to the terminal groups according to the resource demands of the terminal groups, the available resources of the machine clusters, and the access quality may include: processing the available resources of the machine clusters according to preset upper-limit resource utilization rates of the machine clusters to obtain upper-limit available resources of the machine clusters; and obtaining the coverage ratios of the machine clusters to the terminal groups according to the resource demands of the terminal groups, the upper-limit available resources of the machine clusters, and the access quality.

The preset upper-limit resource utilization rates represent upper-limit resource utilization rates of the machine clusters.

For example, the available resources of the machine clusters may be multiplied by the preset upper-limit resource utilization rates of the machine clusters, to obtain the upper-limit available resources of the machine clusters. Assuming that the preset upper-limit resource utilization rate of the machine cluster n is $r_n$, in this case, the upper-limit available resource of the machine cluster n is $a_n'=a_n \times R_n$.

For another example, when the ratios are solved by using a matrix operation, a resource utilization vector $R_n$ may be added:

$R_n=[r_1, r_2, \ldots r_n]$, where $r_j$ is a preset upper-limit resource utilization rate of the machine cluster j.

Before the weight matrix is solved, $A_n$ may be preprocessed. Specifically, an available resource of each machine cluster in $A_n$ is multiplied by a corresponding preset upper-limit resource utilization rate, to obtain an upper-limit available resource, that is, $a_n'=a_n \times r_n$. Then, the weight matrix is calculated by replacing $a_n$ with $a_n'$.

A process of obtaining the ratios according to the resource demands, the upper-limit available resources, and the access quality is similar to step 104 and only differs in that one process involves the available resources, and the other one involves the upper-limit available resources, where the available resources of the machine clusters are replaced with the upper-limit available resources.

In one embodiment, because the upper-limit resource utilization rates are set, the sizes of the available resources are strictly limited. Therefore, it may be possible that obtaining of the ratios fails (that is, there is no solution for resource allocation; for example, there is no solution for the weight matrix) or scheduling accuracy gets worse. For example, for a large machine cluster, a stable operation demand is that whole resource consumption is approximately 60%. However, when a demand amount for this point increases, it is needed that a carrying capacity at this point temporarily exceeds 60% of resources, rather than no solution provided for allocation due to insufficient resources.

To overcome this problem and complete scheduling by fully utilizing the resources of the machine clusters, in one embodiment, preset absolute upper-limit resource utilization rates of the machine clusters may be added, and the upper-limit available resources of the machine clusters are processed by using the utilization rate. Then, the ratios may be obtained based on the processed upper-limit available resources, the access quality, and the resource demands.

That is, the method in one embodiment may further include: processing the upper-limit available resources of the machine clusters according to preset absolute upper-limit resource utilization rates when obtaining of the coverage ratios of the machine clusters to the terminal groups fails, to obtain absolute upper-limit available resources of the machine clusters, where the preset absolute upper-limit resource utilization rates are greater than preset upper-limit resource utilization rates; and obtaining the coverage ratios of the machine clusters to the terminal groups according to the resource demands of the terminal groups, the absolute upper-limit available resources of the machine clusters, and the access quality.

The preset absolute upper-limit resource utilization rate is an absolute upper limit of a resource utilization rate, which is greater than an upper limit of the resource utilization rate.

For example, the upper-limit available resources of the machine clusters may be multiplied by the preset absolute upper-limit resource utilization rates of the machine clusters, and then products are divided by the preset resource upper limits, to obtain the absolute upper-limit available resources of the machine clusters. That is, the available resources of the machine clusters are multiplied with the preset resource absolute upper limits of the machine clusters. Assuming that a preset upper-limit resource utilization rate of the machine cluster n is $r_n$, and a preset absolute upper-limit resource utilization rate is $r_n'$, when obtaining of the ratios fails, the upper-limit available resource of the machine cluster may be processed by using $r_n'$. For example, the absolute upper-limit available resource of the machine cluster n is $$a_j'' = a_j' \times \frac{r_j'}{r_j},$$

and then the ratios are re-obtained according to the absolute upper-limit available resources of the machine clusters, the access quality, and the resource demands.

There are multiple situations in which obtaining of the ratios fails. For example, in a process of obtaining the ratios, it is found that failure of obtaining of the ratios results from that the preset resource limiting-condition cannot be satisfied. That is, the sum of the resource demands of the terminal groups for the machine clusters is greater than the upper-limit available resources of the machine clusters. In this case, the upper-limit available resources of the machine clusters may be processed by using the preset absolute upper-limit resource utilization rates of the machine clusters to obtain the absolute upper-limit available resources of the machine clusters, and then the ratios are re-obtained according to the absolute upper-limit available resources, the resource demands, and the access quality.

For example, when the ratios are solved by using the matrix operation, the resource utilization vector $R_n'$ may be added, where $r_j'$ represents the preset absolute upper-limit resource utilization rate of the machine cluster j.

When the weight matrix is solved, it is found that when for the machine cluster j, $$Um * \sum_{i=1}^{m} n_{i,j} \leq a_j'$$

cannot be satisfied, that is, the upper-limit available resource of the machine cluster j satisfies the resource demands of the terminals, $a_j'$ may be processed by using $r_j'$. For example, the absolute upper-limit available resource $a_j''$ of the machine cluster j is calculated by using a formula $$a_j'' = a_j \times \frac{r_j'}{r_j},$$

and then, the weight matrix is solved.

Thus, the $(r_j'-r_j)$ is a capacity expansion demand of the machine cluster j. One embodiment may record the capacity expansion demand, so as to subsequently perform capacity expansion based on the capacity expansion demand.

In one embodiment, a process of obtaining the ratios according to the resource demands, the absolute upper-limit available resources, and the access quality is similar to step 104 and only differs in that one process involves the available resources, and the other one involves the absolute upper-limit available resources, where the available resources of the machine clusters may be replaced with the upper-limit available resources to obtain the ratios.

In an implementation, to ensure that some terminal groups may preferentially obtain resources, for example, when machine division is performed on the terminals according to provinces, to ensure that terminals in Guangdong (a province) obtain resources prior to those in Guangxi (a different province), resource obtaining priorities may be introduced in one embodiment. A corresponding resource obtaining priority may be set for each terminal group. The resource obtaining priorities may also be considered during access scheduling. That is, obtaining the coverage ratios of the machine clusters to the terminal groups according to a preset resource limiting-condition and the access quality between the terminal groups and the machine clusters may include: obtaining the coverage ratios of the machine clusters to the terminal groups according to the resource demands of the terminal groups, the absolute upper-limit available resources of the machine clusters, and the access quality.

In one embodiment, the obtaining the coverage ratios of the machine clusters to the terminal groups according to the resource demands of the terminal groups, the absolute upper-limit available resources of the machine clusters, and the access quality may include: obtaining a ratio set according to a preset quality limiting-condition, an access quality set, a priority set, and the preset resource limiting-condition, where the access quality set includes access quality between the multiple terminal groups and the multiple machine clusters, the ratio set includes the coverage ratios of the machine clusters to the terminal groups, and the priority set includes resource obtaining priorities of the multiple machine clusters.

The resource obtaining priorities of the machine clusters may be obtained according to attributes of the machine clusters, and specifically, may be obtained according to the geographic locations of the machines. For example, a resource obtaining priority of a machine cluster in Guangdong is higher than that in Guangxi.

When the ratios are calculated by using a matrix, the obtaining a ratio set according to a preset quality limiting-condition, an access quality set, a priority set, and the preset resource limiting-condition may include: creating a corresponding quality matrix according to the access quality set, where a matrix element in the quality matrix represents the access quality between the terminal groups and the machine clusters; creating a corresponding priority matrix according to the priority set, where a matrix element in the priority matrix represents the resource obtaining priorities corresponding to the terminal groups; and obtaining a corresponding weight matrix according to the preset quality limiting-condition, the quality matrix, the priority matrix, and the preset resource limiting-condition.

For example, in a process of calculating the ratios (that is, the weight matrix) by using a matrix, a priority vector $P_m$ may be added, where $p_i$ represents a resource obtaining priority of the terminal group i. In this case, the ratios may be obtained by solving a weight matrix $N_{m \times n}$ when $w=|(D_{m \times n} \times N_{m \times n}^T) \times P_m|$ is the minimum.

In an implementation, to satisfy scheduling demands of manual intervention, any conflict between automatic scheduling and manual adjustment needs to be resolved. For example, to ensure all US resources need to cover the whole US, or 30% of telecom users in Guangdong are provided access to a telecom machine cluster in Shenzhen, in one embodiment, manual adjustment may be preferentially ensured. That is, the preset quality limiting-condition in one embodiment may further include: some of the ratios in the ratio set are predetermined ratios.

For example, it is limited that a coverage ratio $n_{11}$ of the machine cluster 1 to the terminal group 1 is 30%, and a coverage ratio $n_{21}$ of the machine cluster 1 to the terminal group 2 is 20%.

For example, in the process of calculating the ratios by using the matrix, before calculation, some values of the solved vector $N_{m \times n}$ are initialized. For example, it is set that $n_{11}=30\%$, where $n_{11}$ may represent a coverage ratio of a telecom machine cluster in Shenzhen to a telecom machine cluster in Guangdong, and then subsequent calculation of solving the weight matrix may be performed.

In an implementation, to satisfy the capacity expansion demand and accurately expand a capacity of a system, after the obtaining coverage ratios of the machine clusters to the terminal groups, the method in one embodiment may further include: obtaining the sum of the resource demands of the terminal groups for the machine clusters according to the ratios and the resource demands of the terminal groups; obtaining resource differences between the sum of the resource demands and the available resources of the machine clusters; and performing, according to the resource differences, capacity expansion on a system to which the machine clusters belong.

For example, assuming that Qi represents the sum of the resource demands of the terminal groups for the machine cluster i, $Qi=u1 \times n_{1i}+u2 \times n_{2i}+, \ldots +um \times n_{mi}$, where ui is a resource demand of the terminal group i, and $n_{ji}$ is a coverage ratio of the machine cluster i to the terminal group. In this case, a resource difference between the sum Qi of demands of the terminal groups for the machine cluster i and the machine cluster i, that is, ci=ai−Qi, where ci represents a resource difference corresponding to the machine cluster i. Similarly, resource differences corresponding to other machine clusters, for example, a resource difference c1 corresponding to the machine cluster 1, a resource difference c2 corresponding to the machine cluster 2, . . . a resource difference cn corresponding to the machine cluster n may be obtained. Then, capacity expansion is performed on the system based on the resource differences corresponding to the machine clusters. For example, a sum of all the resource differences is obtained, that is, c=c1+c2, . . . +cn, and then capacity expansion is performed based on the sum c.

During actual capacity expansion, there may be two situations. One situation is capacity expansion without user-expected increase, and the other situation is capacity expansion with a user-expected increase. The situations may be generalized as processing the resource demands of the terminal groups. For example, during a matrix operation, the resource demand vector $U^m$ may be adjusted. Specifically, the resource demands may be processed according to terminal-expected increases.

That is, the obtaining coverage ratios of the machine clusters to the terminal groups according to the resource demands of the terminal groups, the available resources of the machine clusters, and the access quality may include: processing the resource demands of the terminal groups according to terminal-expected increases corresponding to the terminal groups, to obtain expected resource demands of the terminal groups; and obtaining the coverage ratios of the machine clusters to the terminal groups according to the expected resource demands of the terminal groups, the available resources of the machine clusters, and the access quality.

The ratios in this case are ratios when the terminal-expected increases are considered. Then, the resource differences may be obtained according to the ratios and the resource demands of the terminal groups, and capacity expansion is performed based on the resource differences. In this way, a capacity expansion demand of machine clusters when there is a terminal-expected increase can be obtained, to provide reference for capacity expansion, and capacity expansion is performed based on the capacity expansion demand, to improve accuracy of capacity expansion and a resource utilization rate.

In one embodiment, a process of obtaining the ratios according to expected resource demands, the available resources, and the access quality is similar to step 104 and only differs in that one process involves the resource demands, and the other one involves the expected resource demands; the resource demands of the terminal groups may be replaced with the expected resource demands to obtain the ratios.

The terminal-expected increases may be terminal increase ratios. In this case, expected increases may be multiplied by the resource demands sent by the terminals, to obtain the expected resource demands of the terminal groups. For example, for the terminal group i, the expected resource demand of the terminal group i is ui"=ui×ui', where ui' is an terminal-expected increase, and ui is an available resource of the terminal group i.

For example, when the ratios are solved by using the matrix operation, a vector Ui' may be added, where ui' represents the terminal-expected increase of the terminal group i. Before the weight matrix is solved, ui is processed by using ui', to obtain the expected resource demand ui" of terminal group i, where ui"=ui×ui'; then the weight matrix is solved after ui is replaced with ui".

In an implementation, during actual capacity expansion, usually, there is a limitation for capacity expansion of a system. That is, in some cases, only resources of particular machine clusters can be applied. Even during capacity expansion, resources at some points need to be removed, some points can apply only the fixed number of machines, and resources at some points are abundant enough to almost completely satisfy demands. Therefore, during capacity expansion, constraints of resources need to be considered. That is, the resource increases are limited. In one embodiment, constraints of capacity expansion resources may be generalized as adjusting the available resources of the machine clusters.

That is, the obtaining coverage ratios of the machine clusters to the terminal groups according to the resource demands of the terminal groups, the available resources of the machine clusters, and the access quality may include: processing the available resources of the machine clusters according to preset resource increases of the machine clusters to obtain target available resources of the machine clusters; and obtaining the coverage ratios of the machine clusters to the terminal groups according to the resource demands of the terminal groups, the target available resources of the machine clusters, and the access quality.

The resource increases may be resource increase ratios. In an implementation, the preset resource increase may include: a preset resource increase upper limit and a preset resource increase absolute upper limit. The preset resource increase upper limit is an upper limit of a machine cluster resource increase, and the preset resource increase absolute upper limit is an absolute upper limit of the machine cluster resource increase. In this case, the available resources of the machine clusters may be processed according to the preset resource increase upper limits and the preset resource increase absolute upper limits, to obtain target available resources of the machine clusters (assuming that $g_j$ is a preset upper-limit resource increase ratio, and $h_j$ is a preset absolute upper-limit resource increase ratio, in this case, the target available resource of the machine cluster is $a_j'''=a_j \times g_j+h_j$). Then, the ratios are obtained based on the target available resources, the resource demands, and the access quality. In this way, the ratios when a resource increase amount is limited can be obtained in one embodiment. Then, the sum of the resource demands of the terminal groups for the machine clusters is obtained according to the ratios and the resource demands of the terminal groups, and the resource differences between the sum of the resource demands and the available resources of the machine clusters are obtained. In this way, in one embodiment, the capacity expansion demands of the machine clusters when the resource increases are limited can be obtained, to provide parameters to capacity expansion. Then, capacity expansion may be performed on the system based on the capacity expansion demands, to improve accuracy of capacity expansion and improve the resource utilization rate.

For example, when the ratios are solved by using the matrix operation, a vector $Gn=[g_1, g_2, \ldots g_n]$ and a vector $Hn=[h_1, h_2, \ldots h_n]$ may be added, where an element $g_j$ in Gn represents a preset upper-limit resource increase ratio of the machine cluster j, an element $h_j$ in Hn represents a preset absolute upper-limit resource increase ratio of the machine cluster j, and that $h1=1$ represents that the machine cluster has no resource increase demands. Before the weight matrix is solved, $a_j$ is processed by using $g_j$ and $a_j$, to obtain a target available resource $a_j'''$ of the machine cluster j, where $a_j'''=a_jg_j+h_j$; then, the weight matrix is solved after replacing $a_j$ with $a_j'''$ in the vector An.

In an implementation, the method may be applicable to capacity reduction evaluation. In this case, the preset upper-limit resource increase ratio or preset absolute upper-limit resource increase ratio may be less than 1 or may be a negative number.

Thus, in one embodiment of the present disclosure, grouping is performed on terminals to obtain multiple terminal groups; division is performed on machines providing resources to obtain multiple machine clusters; then, resource demands of the terminal groups, available resources of the machine clusters, and access quality between the terminal groups and the machine clusters are obtained; coverage ratios of the machine clusters to the terminal groups are obtained according to the resource demands of the terminal groups, the available resources of the machine clusters, and the access quality; access scheduling is performed on the terminals according to the ratios. In this solution, access scheduling may be performed based on the available resources of the machine clusters, the resource demands of the terminal groups, and the access quality between the terminal groups and the machine clusters. That is, the scheduling solution considers both an access capacity and the access quality. Therefore, terminal access scheduling can be optimized, and accuracy of terminal access scheduling is improved relative to the existing technology.

In addition, in one embodiment of the present disclosure, the constraint of the access quality is added to obtain the ratios, ensuring that the whole access quality of the scheduling solution is optimal and improving the resource utilization rate and business service quality after access, so as to improve user experience. In addition, in one embodiment of the present disclosure, the resource differences between the available resources and the resource demands may be obtained, and capacity expansion may be performed according to the resource differences, to provide parameters to capacity expansion and automatically output a capacity expansion solution, so as to improve a speed and accuracy of system capacity expansion.

Further, in one embodiment of the present disclosure, the resource demands, the available resources, and the like may be adjusted according to actual operation demands (a resource use demand, a manual intervention demand, a capacity expansion demand, and the like), so that the access scheduling method in one embodiment can satisfy various personalized demands, and the method has advantages including wide applicability, strong flexibility, easy expansion, and the like.

In one embodiment, detailed descriptions are provided by using an example in which the access scheduling apparatus is specifically integrated in a scheduling server, and the machines providing resources are servers.

Figure 2:
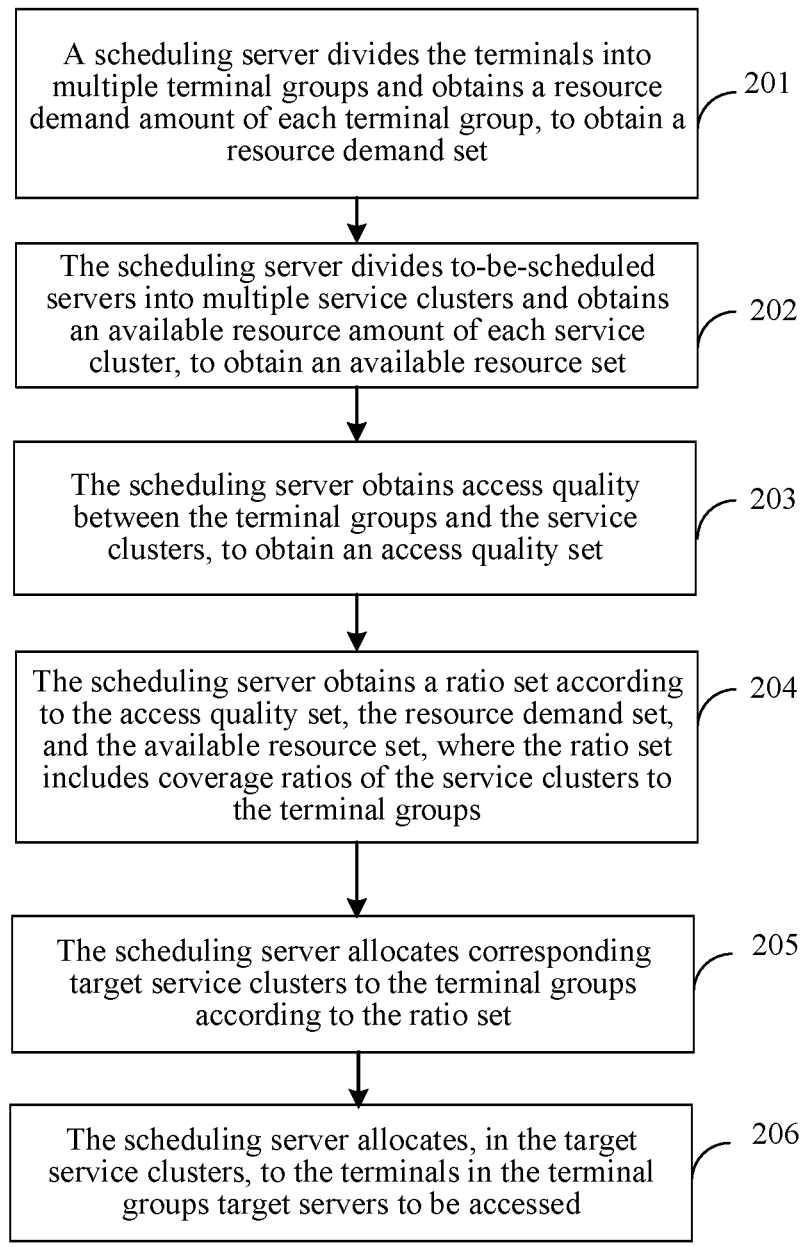
FIG. 2 is a flowchart of a terminal access scheduling method according to another embodiment of the present disclosure.

As shown in FIG. 2, a specific process of a terminal access scheduling method may include the followings.

Step 201: A scheduling server divides to-be-scheduled terminals into multiple terminal groups and obtains a resource demand amount of each terminal group, to obtain a resource demand set.

The resource demand set includes a resource demand amount of each terminal group. In one embodiment, the terminal may be a device located at the outermost of a computer network in the network. That is, the terminal may be user equipment. For example, the terminal may be a personal computer, a mobile phone, a tablet computer, or other user equipment.

Specifically, the scheduling server may perform grouping on the terminals according to geographic locations or network addresses of the terminals. For example, the scheduling server performs grouping on the terminals according to provinces in which the terminals are located.

In one embodiment, the resource demand amounts of the terminal groups may be obtained according to resource demand amounts of the terminals in the terminal groups, and for example, are a sum of the resource demand amounts of the terminals in the groups. Resource demands of the terminals may be obtained through analysis according to historical request amounts, and new services may be obtained according to a manner such as subjective evaluation.

For example, the scheduling server divides the terminals into m terminal groups, and then obtains a resource demand amount u1 of a terminal group 1, a resource demand amount u2 of a terminal group 2, . . . a resource demand amount i of a terminal group i, and a resource demand amount um of a terminal group m. In this case, a set u=(u1, u2, . . . ui, . . . um) may be obtained.

When a ratio set is calculated by using a matrix model, the resource demand set may be converted into a corresponding resource demand matrix. For example, the set u is converted into a resource matrix $U_m$, and $U_m$ may be also referred to as a resource vector:

$U_m = [u_1, u_2, \ldots U_m]$, where $u_i$ represents the resource demand amount of the terminal group i.

In an implementation, in a scenario of capacity expansion with a terminal-expected increase, to satisfy personalized demands of capacity expansion, the resource demand amounts of the terminal groups may also be adjusted. Specifically, the resource demand amounts of the terminal groups are adjusted according to terminal-expected increases corresponding to the terminal groups. For example, when the terminal-expected increases are terminal-expected increase ratios, the resource demand amounts of the terminal groups may be multiplied with the expected increase ratios corresponding to the clusters.

For example, assuming that a terminal-expected increase ratio of the terminal group i is $u_i'$, if there is no increase, $u_i'$1. When the resource demand amount is ui, in one embodiment, ui may be initialized by using $u_i'$, and specifically, it is made that $u_i = u_i \times u_i'$. In this case, ui is an expected available resource of the terminal group i.

For another example, in the matrix model, a vector $U_m'$ may be added in one embodiment, where uj' expresses the terminal-expected increase ratio of the terminal group j. In this case, each element in the vector $U_m$ may be initialized by using the formula $u_i = u_i \times u_i'$.

Step 202: The scheduling server divides to-be-scheduled servers into multiple server clusters and obtains an available resource amount of each server cluster, to obtain an available resource set.

The available resource set includes an available resource amount of each server cluster.

Specifically, the scheduling server may divide the servers according to attributes of the servers, and for example, may divide the servers according to areas to which the servers belong or geographic locations of the servers.

The available resource amounts of the server clusters may be obtained according to available resource amounts of servers in the server clusters, and for example, are a sum of available resources of the servers in the clusters. There are multiple ways for obtaining the available resource amounts of the servers. For example, the available resource amounts of the servers are obtained by performing a stress test on the servers, or the available resource amounts of the servers may be obtained by analyzing historical operation information of the servers.

For example, the scheduling server divides the servers into n server clusters, and then the scheduling server obtains an available resource amount of each server cluster. Specifically, the scheduling server obtains an available resource amount a1 of a server cluster 1, an available resource amount a2 of a server cluster 2, . . . an available resource amount aj of a server cluster j, . . . , and an available resource amount an of a server cluster n. In this case, an available resource set $A = (a_1, a_2, \ldots a_j, \ldots a_m)$ may be obtained.

When a ratio set is calculated by using the matrix model, the available resource set may be converted into a corresponding available resource matrix. For example, the set A is converted into a resource matrix $A_n$, and the resource matrix $A_n$ may be also referred to as a vector $A_n$:

$A_n = [a_1, a_2, \ldots a_n]$, where aj represents the available resource amount of the server cluster j.

In an implementation, to satisfy the need for limiting the resource use of the server clusters, for example, the resource utilization rates of all server clusters are at approximately 70%, while the resource utilization rates of some server clusters reach 80%, in one embodiment, the available resource amounts of the server clusters may also be adjusted. Specifically, available resources of the server clusters may be adjusted according to upper-limit resource utilization rates of the server clusters. For example, the available resources may be initialized according to the upper-limit resource utilization rates, and the upper-limit resource utilization rates are upper-limit resource utilization rates of the server clusters.

For example, assuming that an upper-limit resource utilization rate of the server cluster j is rj, the available resource amount aj of the server cluster j may be initialized by using rj. Specifically, it may be made that $aj = aj \times rj$. In this case, aj is an upper-limit available resource amount of the server cluster j. In this case, an available resource set A is an upper-limit available resource set A.

For another example, in the matrix model, a vector Rn may be added in one embodiment, where rj expresses the upper-limit resource utilization rate of the server cluster j. In this case, each element in the vector $A_n$ may be initialized by using the formula $aj = aj \times rj$.

In an implementation, in a scenario of capacity expansion with a resource constraint, the available resource amounts of the server clusters may be adjusted. Specifically, the available resource amounts of the server clusters may be adjusted according to resource increases corresponding to the server clusters. The resource increases may include upper limit resource increases and absolute upper limit resource increases, and the increases may be increase ratios.

For example, assuming that an upper-limit resource increase ratio of a server cluster i is $g_i$, and an absolute upper-limit resource increase ratio is $h_i$, in this case, an available resource amount a of the server cluster i may be initialized by using $g_i$ and $h_i$. Specifically, it is made that $a_i = a_i \times g_i + h$. In this case, ai is a target available resource of the server cluster i.

For another example, in the matrix model, a vector $Gn = [g_1, g_2, g_n]$ and a vector $H_n = [h_1, h_2, \ldots h_n]$ may be added, where an element $g_j$ in Gn represents a preset upper-limit resource increase ratio of the server cluster j, an element $h_j$ in Hn represents a preset absolute upper-limit resource increase ratio of the server cluster j, and that h1=1 represents that the server cluster has no resource increase demands. Each element in the vector An is initialized by using the formula $a_i = a_i \times g_i + h_i$.

Step 203: The scheduling server obtains access quality between the terminal groups and the server clusters, to obtain an access quality set.

The access quality set includes: access quality between each terminal group and each server cluster.

The access quality between the terminal groups and the server clusters may be network service quality from the terminal groups to the server clusters. Network service quality (that is, access quality) between the terminals and the servers may be obtained according to at least one of network performance parameters between the terminals and the services, historical operation information between the terminals and the services, and physical distances between the terminals and the services, network addresses of the terminals, and network topology maps of network systems to which the terminals and the services belong. The network performance parameters may include: network delay, a packet loss rate, delay jitter, and the like.

For example, when there are m terminal groups and n server clusters, access quality $d_{11}$ between a terminal group 1 and a server cluster 1, access quality $d_{12}$ between the terminal group 1 and a server cluster 2, . . . and access quality $d_{mn}$ between a terminal group m and a server cluster n may be obtained. In this case, an access quality set $D = (d_{11}, d_{12}, d_{13}, \ldots d_{1n}, d_{21}, d_{22}, \ldots d_{2n}, \ldots, d_{m1}, d_{m2}, \ldots, d_{mn})$ may be obtained, where $d_{ij}$ represents access quality between a terminal group i and a server cluster j.

When a ratio set is calculated by using the matrix model, the access quality set may be converted into a corresponding access quality matrix. For example, the set D is converted into an access quality matrix $D_{m \times n}$, and $D_{m \times n}$ may be also referred to as an access quality vector:

$$D_{m \times n} = User \begin{bmatrix} d_{1,1} & d_{1,2} & \cdots & d_{1,n} \\ d_{2,1} & \cdots & \cdots & \vdots \\ \vdots & \cdots & \cdots & \vdots \\ d_{m,1} & \cdots & \cdots & d_{m,n} \end{bmatrix} \overset{Resource}{,}$$

where $d_{ij}$ represents access quality between the terminal group i and the server cluster j.

For ease of calculation, in one embodiment, logic distances between the terminal groups and the server clusters may also be used to represent the access quality. In this case, the access quality matrix may be a logic distance matrix. For example, in this case, $D_{m \times n}$ may be a logic distance matrix, where $d_{ij}$ is the logic distance between the terminal group i and the server cluster j. The logic distance represents access quality between the terminal group i and the server cluster j. A shorter logic distance represents greater or better access quality.

Step 204: The scheduling server obtains a ratio set according to the access quality set, the resource demand set, and the available resource set, where the ratio set includes coverage ratios of the server clusters to the terminal groups.

Coverage ratios of the server clusters to the terminal groups are percentages of resources provided by the server clusters to the terminal groups to resource demands of the terminal groups. For example, the server cluster 1 covers 30% of the terminal group 1, which means that a resource provided by the server cluster 1 to the terminal group 1 occupies 30% of a resource demand of the terminal group 1, where i and j are both positive integers greater than 1.

For example, the scheduling server obtains a ratio set N according to the access quality set D, the resource demand set U, and the available resource set A, and the ratio set $N=(n_{11}, n_{12}, n_{13}, \ldots n_{1n}, n_{21}, n_{22}, \ldots, n_{m1}, n_{m2}, \ldots, n_{mn})$, where $n_{ij}$ represents a coverage ratio of the server cluster j to the terminal group i.

In one embodiment, there are multiple ways for obtaining the ratio set according to the access quality set, the resource demand set, and the available resource set. For example, that a sum of resource demands of the terminal groups for machine clusters is less than available resources of the machine clusters is used as a resource limiting-condition, and then the ratio set is obtained according to the limiting-condition and the access quality set.

That is, that the scheduling server obtains a ratio set according to the access quality set, the resource demand set, and the available resource set may include: obtaining, by the scheduling server, the corresponding ratio set according to the resource limiting-condition and the access quality set. The resource limiting-condition includes: a sum of the resource demands of the terminal groups for the server clusters is less than or equal to the available resources of the server clusters, and the sum of the resource demands is obtained according to the resource demand set and the to-be-obtained ratio set.

In one embodiment, the sum of the resource demands of the terminal groups for the server clusters is a sum of resources that the server clusters need to provide to all the terminal groups.

For example, when the matrix model is used, a weight matrix $N_{m \times n}$ may be obtained according to the access quality matrix $D_{m \times n}$, the resource demand set $U_m$, and the available resource matrix $A_n$, where an element $n_{ij}$ in the weight matrix $N_{m \times n}$ represents a coverage ratio of the server cluster j to the terminal group i. Specifically, the weight matrix $N_{m \times n}$ may be solved according to the resource limiting-condition: $U_m \times N_{m \times n} \leq A_n$ and the access quality matrix $D_{m \times n}$, so as to obtain a corresponding ratio set.

In an implementation, to improve business service quality and ensure reasonableness of access scheduling, in one embodiment, that the sum of the access quality between the terminal groups and the machine clusters is the maximum may be used as optimal scheduling. That is, in one embodiment, a ratio set when the sum of the access quality is the maximum or best may be obtained. In this case, the obtaining, by the scheduling server, the corresponding ratio set according to the resource limiting-condition and the access quality set may include: obtaining, by the scheduling server, the corresponding ratio set according to the resource limiting-condition, a quality limiting-condition, and the access quality set, where the quality limiting-condition includes that the sum of the access quality in the access quality set is the maximum. In an implementation, the quality limiting-condition may be represented or obtained by the access quality set and the to-be-obtained ratio set.

For example, when the matrix model is used, first, the access quality matrix $D_{m \times n}$, the resource demand set $U_m$, and the available resource matrix $A_n$ are obtained, and then the resource limiting-condition: $U_m \times N_{m \times n} \leq A_n$ is obtained. The quality limiting-condition that the sum of the access quality is the maximum may be represented by the access quality matrix $D_{m \times n}$ and the to-be-obtained weight matrix $N_{m \times n}$. For example, that the sum of the access quality is the maximum may be represented when $w=|D_{m \times n} \times N_{m \times n}^T|$ is the minimum or maximum. In this case, the ratio set may be obtained by solving the weight matrix $N_{m \times n}$ when $w=|D_{m \times n} \times N_{m \times n}^T|$ is the maximum or minimum. In an actual application, if $d_{ij}$ in $D_{m \times n}$ is the logic distance between the terminal group i and the server cluster j (a shorter logic distance represents greater access quality), in this case, the needed ratio set, that is, optimal scheduling, may be obtained by solving the weight matrix $N_{m \times n}$ according to the resource limiting-condition when $w=|D_{m \times n} \times N_{m \times n}^T|$ is the minimum.

In an implementation, to ensure that some terminal groups may preferentially obtain resources, for example, when grouping is performed on the terminals according to countries, to ensure that Chinese terminals obtain resources prior to English terminals, in one embodiment, resource obtaining priorities of the terminal groups may be set. The resource obtaining priorities may also be considered when the ratios are obtained.

Thus, the obtaining, by the scheduling server, the corresponding ratio set according to the resource limiting-condition, a quality limiting-condition, and the access quality set may include: obtaining, by the scheduling server, the corresponding ratio set according to the resource limiting-condition, a priority set, the quality limiting-condition, and the access quality set, where the priority set includes resource obtaining priorities of the terminal groups.

For example, when the ratios are calculated by using the matrix model, a priority set P may be converted into a matrix $P_m$, that is, a priority vector, where $p_i$ represents a resource obtaining priority of the terminal group i. In this case, the ratio set may be obtained by solving the weight matrix $N_{m \times n}$ when the $w=|(D_{m \times n} \times N_{m \times n}{}^T) \times P_m|$ is the minimum or maximum.

In an implementation, to satisfy the need for scheduling manual intervention, the conflict between automatic scheduling and manual adjustment needs to be resolved. In one embodiment, manual adjustment may be preferentially ensured. That is, a ratio limiting-condition may also be added in one embodiment. The ratio limiting-condition may include: some of the ratios in the ratio set are predetermined ratios. Thus, the obtaining, by the scheduling server, the corresponding ratio set according to the resource limiting-condition, a quality limiting-condition, and the access quality set may include: obtaining, by the scheduling server, the corresponding ratio set according to the resource limiting-condition, the quality limiting-condition, the ratio limiting-condition, and the access quality set.

For example, in the process of calculating the ratios by using the matrix model, before calculation, some values of the solved vector $N_{m \times n}$ are initialized. For example, it is set that $n_{31}=40\%$, where $n_{31}$ may represent that a coverage ratio of the server cluster 3 to the terminal group is 40%.

Because once the resource utilization rate of the server clusters is limited, the sizes of resources of the server clusters are strictly limited. That is, after the available resources of the server clusters are adjusted by using the preset upper-limit resource utilization rates, the ratios may not be obtained and, consequently, scheduling cannot be performed. For example, when a demand of a terminal group increases, it may cause that the sum of the resource demands of the terminal groups for the server clusters is greater than upper-limit available resource amounts of the server clusters. In this case, it cannot satisfy the resource limiting-condition. Therefore, the ratio set cannot be obtained. To overcome the problem, in one embodiment, the available resource amounts may be adjusted according to the upper-limit resource utilization rates. In addition, when obtaining of the ratio set by the scheduling server fails, the available resource amounts in the available resource set are adjusted according to absolute upper-limit resource utilization rates, and the absolute upper-limit resource utilization rates are greater than the upper-limit resource utilization rates.

For example, assuming that an upper-limit resource utilization rate of the server cluster j is rj, and the absolute upper-limit resource utilization rate is rj', to satisfy the resource use demand, an available resource amount aj of the server cluster j may be initialized by using rj. Specifically, it may be made that aj=aj×rj. In this case, aj is an upper-limit available resource amount of the server cluster j. Then, the scheduling server may obtain the ratio set N according to the access quality set D, the resource demand set U, and the available resource set A. If obtaining of the ratio set fails, the upper-limit available resource amount aj in the available resource set A may be initialized according to that the absolute upper-limit resource utilization rate is rj', and initialized aj is an absolute upper-limit available resource amount. Specifically, it may be made that $$a_j = a_j \times \frac{r'_j}{r_j}.$$

After initialization of all upper-limit available resource amounts in the available resource set A is completed, the scheduling server may obtain the ratio set N again according to the access quality set D, the resource demand set U, and the available resource set A.

Step 205: The scheduling server allocates corresponding target server clusters to the terminal groups according to the ratio set.

Specifically, the corresponding target server clusters may be allocated to the terminal groups by using a preset algorithm and the ratio set.

Step 206: The scheduling server allocates, in the target server clusters, to the terminals in the terminal groups target servers that need to be accessed.

Specifically, during allocation, target servers may be allocated to the terminals according to available resources or geographic locations of the servers in the target server clusters.

It should be noted that, in a specific implementation, the scheduling server may be an independent entity or include multiple entities, for example, may include multiple server devices.

Thus, in one embodiment, the scheduling server obtains the ratio set according to the access quality set, the resource demand set, and the available resource set; then, the scheduling server allocates corresponding target server clusters to the terminal groups according to the ratio set; the scheduling server allocates, in the target server clusters, to the terminals in the terminal groups target servers that need to be accessed. In this solution, access scheduling may be performed based on the available resources of the server clusters, the resource demands of the terminal groups, and the access quality between the terminal groups and the server clusters. That is, the scheduling solution considers both the access capacity and the access quality. Therefore, terminal access scheduling can be optimized, and accuracy of terminal access scheduling is improved relative to the existing technology.

In addition, in one embodiment of the present disclosure, the weight matrix is calculated by using a matrix vector model, so as to quickly obtain the coverage ratios of the server clusters to the terminal groups, thereby improving efficiency of access scheduling.

On the other hand, the scheduling solution provided in one embodiment of the present disclosure may include using by default that the access quality is the best as optimal scheduling, to improve the system resource utilization rate and improve business service quality after access. In addition, in the scheduling solution, the resource demands, the available resources, and the like, may be adjusted according to actual operation demands (a resource use demand, a manual intervention demand, a capacity expansion demand, and the like), so that the access scheduling method in one embodiment can satisfy various personalized demands, and the method has advantages including wide applicability, strong flexibility, easy expansion, and the like.

Figure 3A:
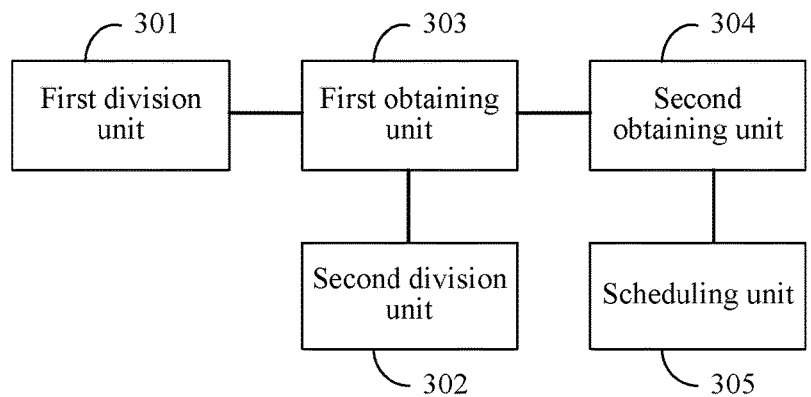
FIG. 3A is a schematic structural diagram of a terminal access scheduling apparatus according to another embodiment of the present disclosure.

To better implement the foregoing method, an embodiment of the present disclosure further provides a terminal access scheduling apparatus. As shown in FIG. 3A, the access scheduling apparatus may further include a first division unit 301, a second division unit 302, a first obtaining unit 303, a second obtaining unit 304, and a scheduling unit 305.

The first division unit 301 is configured to perform grouping on terminals to obtain multiple terminal groups. For example, the first division unit 301 may be configured to perform grouping on the terminals according to geographic locations of the terminals.

The geographic locations of the terminals may include current geographic locations of the terminals or network-registered home locations of the terminals. For example, grouping may be performed according to areas (regions, cities, provinces, nations, and the like) in which the terminals are located or that are registered by a network. Specifically, terminals having the same areas in which the terminals are located or that are registered by a network are classified into the same terminal group.

The second division unit 302 is configured to perform cluster division on machines providing resources to obtain multiple machine clusters. For example, the second division unit 302 may be configured to perform cluster division on the machines according to geographic locations of the machines providing resources. For example, cluster division may be performed according to areas (regions, cities, provinces, nations, and the like) in which the machines are located. For examples, machines located in a province are divided into a machine cluster.

The first obtaining unit 303 is configured to obtain resource demands of the terminal groups, available resources of the machine clusters, and access quality between the terminal groups and the machine clusters.

There are multiple ways for obtaining the resource demands of the terminal groups. For example, the resource demands of the terminal groups may be obtained based on historical request amounts of the terminal groups. That is, the first obtaining unit 303 may be configured to: obtain historical request amounts of the terminals in the terminal groups; obtain the resource demands of the terminals in the terminal groups according to the historical request amounts; and obtain the resource demands of the terminal groups according to the resource demands of the terminals in the terminal groups.

Similarly, there may be multiple ways for obtaining the available resources of the machine clusters in one embodiment. For example, the available resources of the machine clusters may be obtained in a manner of a stress test. Specifically, a stress test is performed on the machines in the machine clusters, to obtain available resources of the machines, and then the available resources of the machine clusters are obtained according to the available resources of the machines in the machine clusters. In an actual test, to improve the obtaining speed and access scheduling efficiency, the stress test may be performed based on types of the machines, and then the available resources of the machine clusters may be obtained according to the number of different types of machines.

In one embodiment, the access quality between the terminal groups and the machine clusters may be network service quality from the terminal groups to the machine clusters. Network service quality (that is, access quality) between the terminals and the machines may be obtained according to at least one of network performance parameters between the terminals and the machines, historical operation information between the terminals and the machines, and physical distances between the terminals and the machines, network addresses of the terminals, and network topology maps of network systems to which the terminals and the machines belong. The network performance parameters may include: network delay, a packet loss rate, delay jitter, and the like.

The second obtaining unit 304 is configured to obtain coverage ratios of the machine clusters to the terminal groups according to the resource demands of the terminal groups, the available resources of the machine clusters, and the access quality.

For example, the second obtaining unit 304 may be configured to: obtain the coverage ratios of the machine clusters to the terminal groups according to a preset resource limiting-condition and the access quality between the terminal groups and the machine clusters. The preset resource limiting-condition includes: a sum of the resource demands of the terminal groups for the machine clusters is less than or equal to the available resources of the machine clusters, and the sum of the resource demands is obtained according to the resource demands of the terminal groups and the to-be-obtained ratios.

For another example, the second obtaining unit 304 may be configured to: obtain a ratio set according to a preset quality limiting-condition, an access quality set, and the preset resource limiting-condition, where the access quality set includes access quality between the multiple terminal groups and the multiple machine clusters, and the ratio set includes the coverage ratios of the machine clusters to the terminal groups. The preset quality limiting-condition includes: the sum of the access quality in the access quality set is the maximum.

Specifically, the second obtaining unit 304 may include: a matrix creation sub-unit and a ratio obtaining sub-unit.

The matrix creation sub-unit is configured to create a corresponding quality matrix according to the access quality set, where a matrix element in the quality matrix represents the access quality between the terminal groups and the machine clusters.

The ratio obtaining sub-unit is configured to obtain a corresponding weight matrix according to the preset quality limiting-condition, the quality matrix, and the preset resource limiting-condition, where a matrix element in the weight matrix represents the coverage ratios of the machine clusters to the terminal groups.

The scheduling unit is specifically configured to perform access scheduling for the terminals according to the weight matrix.

In an implementation, to satisfy resource limiting demands, the second obtaining unit 304 may include a processing sub-unit and a ratio obtaining sub-unit.

The processing sub-unit is configured to process the available resources of the machine clusters according to preset upper-limit resource utilization rates of the machine clusters to obtain upper-limit available resources of the machine clusters.

The ratio obtaining sub-unit is configured to obtain the coverage ratios of the machine clusters to the terminal groups according to the resource demands of the terminal groups, the upper-limit available resources of the machine clusters, and the access quality.

The processing sub-unit is further configured to: process the upper-limit available resources of the machine clusters according to preset absolute upper-limit resource utilization rates when obtaining of the coverage ratios of the machine clusters to the terminal groups fails, to obtain absolute upper-limit available resources of the machine clusters, where the preset absolute upper-limit resource utilization rates are greater than preset upper-limit resource utilization rates.

The ratio obtaining sub-unit is further configured to obtain the coverage ratios of the machine clusters to the terminal groups according to the resource demands of the terminal groups, the absolute upper-limit available resources of the machine clusters, and the access quality.

In an implementation, to satisfy demands of preferentially obtaining resources, the second obtaining unit in one embodiment may be configured to: obtain the coverage ratios of the machine clusters to the terminal groups according to the resource demands of the terminal groups, the absolute upper-limit available resources of the machine clusters, and the access quality.

Figure 3B:
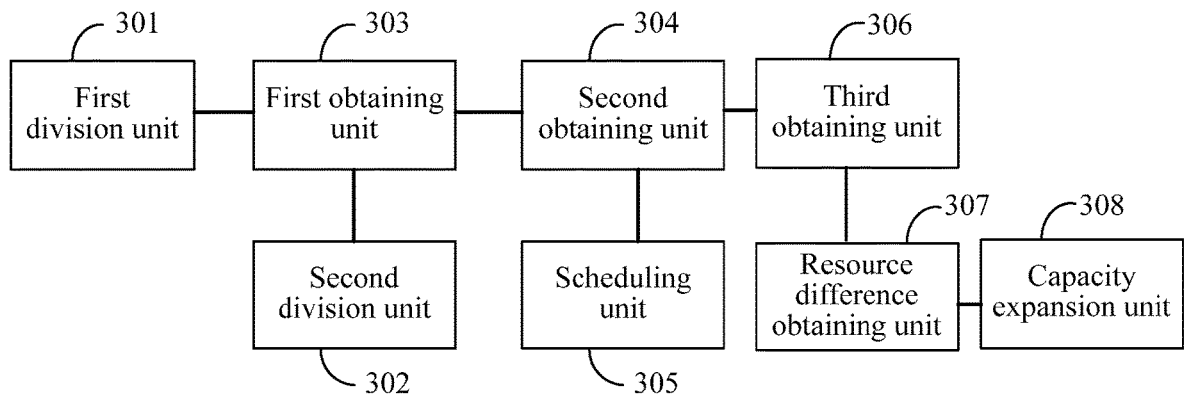
FIG. 3B is a schematic structural diagram of another terminal access scheduling apparatus according to another embodiment of the present disclosure.

In an implementation, to satisfy personalized demands of capacity expansion, referring to FIG. 3B, the access scheduling apparatus in one embodiment further includes: a third obtaining unit 306, a resource difference obtaining unit 307, and a capacity expansion unit 308.

The third obtaining unit 306 is configured to obtain the sum of the resource demands of the terminal groups for the machine clusters according to the ratios and the resource demands of the terminal groups.

The resource difference obtaining unit 307 is configured to obtain resource differences between the sum of the resource demands and the available resources of the machine clusters.

The capacity expansion unit 308 is configured to perform, according to the resource differences, capacity expansion on a system to which the machine clusters belong.

In an implementation, based on the access apparatus shown in FIG. 3B, to implement capacity expansion with a user expected increase, the second obtaining unit 304 may be configured to: process the resource demands of the terminal groups according to terminal-expected increases corresponding to the terminal groups, to obtain expected resource demands of the terminal groups; and obtain the coverage ratios of the machine clusters to the terminal groups according to the expected resource demands of the terminal groups, the available resources of the machine clusters, and the access quality.

In an implementation, based on the access apparatus shown in FIG. 3B, to implement capacity expansion with a resource limitation, the second obtaining unit 304 may be configured to: process the available resources of the machine clusters according to preset resource increases of the machine clusters to obtain target available resources of the machine clusters; and obtain the coverage ratios of the machine clusters to the terminal groups according to the resource demands of the terminal groups, the target available resources of the machine clusters, and the access quality.

The scheduling unit 305 is configured to perform access scheduling according to the ratios.

For example, when the ratio set or weight matrix is obtained, the scheduling unit 305 may be configured to perform access scheduling according to the ratio set or weight matrix.

In one embodiment, the scheduling unit 305 may be configured to: determine, according to the ratios, target machine clusters to which the terminal groups access; and determine from the target machine clusters target machines to which the terminals in the terminal groups need to access.

Specifically, a calculation may be performed on the ratios by using a preset algorithm, to obtain a calculation result, and the target machine clusters to which the terminal groups access are determined according to the operation result. The preset algorithm may be set according actual demands. For example, the preset algorithm may be a weighting algorithm.

During specific implementation, the foregoing units may be implemented as independent entities, or may be randomly combined, or may be implemented as a same entity or several entities. For specific implementation of the foregoing units, refer to the foregoing method embodiments. Details are not described herein again.

The access scheduling apparatus may be specifically integrated in a server or another device that needs to perform access scheduling.

Thus, in the access scheduling apparatus of one embodiment, the first division unit 301 performs grouping on terminals to obtain multiple terminal groups; the second division unit 302 performs division on machines providing resources to obtain multiple machine clusters; then, the first obtaining unit 303 obtains resource demands of the terminal groups, available resources of the machine clusters, and access quality between the terminal groups and the machine clusters; the second obtaining unit 304 obtains coverage ratios of the machine clusters to the terminal groups according to the resource demands of the terminal groups, the available resources of the machine clusters, and the access quality; the scheduling unit 305 performs access scheduling on the terminals according to the ratios. In the solution, access scheduling may be performed based on the available resources of the machine clusters, the resource demands of the terminal groups, and the access quality between the terminal groups and the machine clusters. That is, the scheduling solution considers both the access capacity and the access quality. Therefore, terminal access scheduling can be optimized, and accuracy of terminal access scheduling is improved relative to the existing technology.

In the several embodiments provided in the present disclosure, it should be understood that the disclosed method and apparatus may be implemented in other manners. The described apparatus embodiments are merely exemplary. For example, the module division is a merely logical function division and may be other division manners during actual implementation. For example, multiple modules or components may be combined or integrated into another system, or some features may be ignored or not executed. In addition, the displayed or discussed mutual communication connections between the components may be implemented through some interfaces, indirect couplings or communication connections between the devices or modules, or electrical connections, mechanical connections, or connections in other forms.

The modules described as separation parts may be or may not be physically separated. The parts displayed as modules may be or may not be physical modules. That is, the modules may be located in a same place, or may be distributed to multiple network modules. Some or all of the modules are selected according to actual requirements to achieve the objective of the solutions of the embodiments.

In addition, functional modules in the embodiments of the present disclosure may be all integrated in a processing module, each module is separately used as a module, or two or more modules are integrated in a module. The integrated module may be implemented in a form of hardware, or may be implemented in form of hardware plus a software functional module.

A person of ordinary skill in the art may understand that all or some of the steps of the foregoing method embodiments may be implemented by using hardware relevant to a program instruction. The program may be stored in a computer readable storage medium. When being executed, the program performs steps of the foregoing method embodiments. The storage medium includes: various media capable of storing program code such as a mobile storage device, a read-only memory (ROM, Read-Only Memory), a magnetic disk, or an optical disc.

Figure 4:
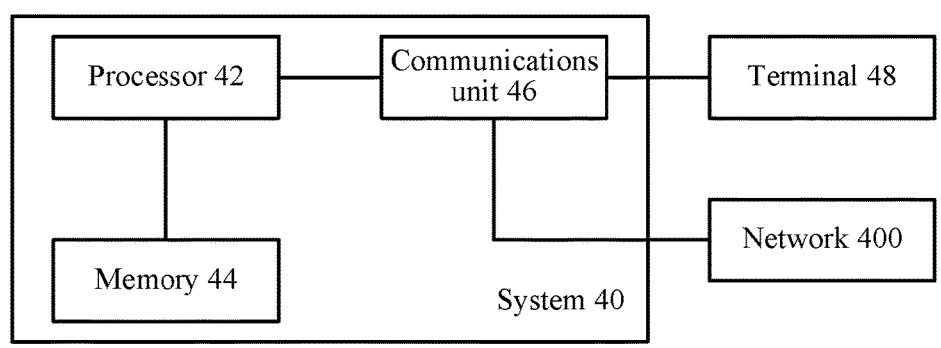
FIG. 4 is a hardware structural diagram of a computer system implementing a scheduling server according to an embodiment of the present disclosure.

For example, FIG. 4 shows a hardware structural block diagram of a computer system for implementing a scheduling server, a target server, and/or a target server cluster. As shown in FIG. 4, the system 40 may include one or more processors 42 (for description convenience, a processor is shown in the figure) and a memory 44. Specifically, the memory 44 stores computer programs or machine code. When the processor 42 calls and performs, by accessing the memory 44, the computer programs or the machine code in the memory 44, operations according to methods or apparatuses of any one of the disclosed embodiments of the present disclosure may be implemented. The system 40 may coincide with, include, or implement the disclosed scheduling server, target server, or target server cluster.

Further, the system 40 may include a communication unit 46. The processor 42 may connect with and/or provide access to at least one terminal 48 through the communication unit 46 in a wired or wireless manner. The processor 42 may also connect other servers through network 400 (which may also be a wired interface or wireless interface), so as to implement the various disclosed embodiments. Similarly, the memory 44 may include but is not limited to removable memories such as a ROM, a RAM, or a CD-ROM, and stores program code, functional modules, and the like.

Alternatively, in the embodiments of the present disclosure, if implemented in the form of software functional modules, the technical solutions of the embodiments of the present disclosure may be implemented in a form of a software product. The computer software product is stored in a storage medium and includes several instructions for instructing a computer device (which may be a personal computer, a server, a network device, or the like) to perform all or some of the methods in the embodiments of the present disclosure. The foregoing storage medium includes: any media that can store program code, such as a mobile storage device, a ROM, a magnetic disk, or an optical disc.

It should be noted that, the foregoing embodiments are only used as examples, but the present disclosure is not limited thereto. A person of ordinary skill in the art should understand that a person of ordinary skill in the art may make other amendments to the technical solutions recorded in the foregoing embodiments or perform equivalent replacement on some or all of technical features therein, without departing from the scope of the technical solutions of the embodiments of the present disclosure.

INDUSTRIAL APPLICABILITY

In the technical solutions of the present disclosure, access scheduling is performed based on the available resources of the machine clusters, the resource demands of the terminal groups, and the access quality between the terminal groups and the machine clusters. Thus, the scheduling solution considers both the access capacity and the access quality. Therefore, terminal access scheduling can be optimized, and accuracy of terminal access scheduling is improved relative to the existing technology.

What is claimed is:

1. A terminal access scheduling method, comprising:
    performing, by a scheduling server, grouping on terminals that need access, to obtain multiple terminal groups;
    performing, by the scheduling server, cluster division on machines providing resources for access, to obtain multiple machine clusters;
    obtaining, by the scheduling server, resource demands of the terminal groups, available resources of the machine clusters, and access quality between the terminal groups and the machine clusters;
    obtaining, by the scheduling server, coverage ratios of the machine clusters to the terminal groups according to the resource demands of the terminal groups, the available resources of the machine clusters, and the access quality; and
    performing, by the scheduling server, access scheduling for the terminals according to the coverage ratios.

2. The method according to claim 1, wherein the obtaining, by the scheduling server, coverage ratios of the machine clusters to the terminal groups according to the resource demands of the terminal groups, the available resources of the machine clusters, and the access quality comprises:
    obtaining the coverage ratios of the machine clusters to the terminal groups according to a preset resource limiting-condition, and the access quality between the terminal groups and the machine clusters,
    wherein the preset resource limiting-condition comprises: a sum of the resource demands of the terminal groups for the machine clusters is less than or equal to the available resources of the machine clusters, and the sum of the resource demands is obtained according to the resource demands of the terminal groups and the coverage ratios.

3. The method according to claim 2, wherein the obtaining the coverage ratios of the machine clusters to the terminal groups according to a preset resource limiting-condition and the access quality between the terminal groups and the machine clusters comprises:
    obtaining a ratio set according to a preset quality limiting-condition, an access quality set, and the preset resource limiting-condition, wherein the access quality set comprises access quality between the multiple terminal groups and the multiple machine clusters, and the ratio set comprises the coverage ratios of the machine clusters to the terminal groups; and
    the preset quality limiting-condition comprises: a sum of the access quality in the access quality set is maximum.

4. The method according to claim 3, wherein the obtaining a ratio set according to a preset quality limiting-condition, an access quality set, and the preset resource limiting-condition comprises:
    creating a corresponding quality matrix according to the access quality set, wherein a matrix element in the quality matrix represents the access quality between the terminal groups and the machine clusters; and
    obtaining a corresponding weight matrix according to the preset quality limiting-condition, the quality matrix, and the preset resource limiting-condition, wherein a matrix element in the weight matrix represents the coverage ratios of the machine clusters to the terminal groups; and
    the performing access scheduling on the terminals according to the ratios specifically comprises: performing access scheduling on the terminals according to the weight matrix.

5. The method according to claim 3, wherein the preset quality limiting-condition further comprises: some of the ratios in the ratio set are predetermined ratios.

6. The method according to claim 1, wherein the obtaining, by the scheduling server, coverage ratios of the machine clusters to the terminal groups according to the resource demands of the terminal groups, the available resources of the machine clusters, and the access quality comprises:
    processing the available resources of the machine clusters according to preset upper-limit resource utilization rates of the machine clusters to obtain upper-limit available resources of the machine clusters; and
    obtaining the coverage ratios of the machine clusters to the terminal groups according to the resource demands of the terminal groups, the upper-limit available resources of the machine clusters, and the access quality.

7. The method according to claim 6, further comprising:
when obtaining of the coverage ratios of the machine clusters to the terminal groups fails, processing, by the scheduling server, the upper-limit available resources of the machine clusters according to preset absolute upper-limit resource utilization rates, to obtain absolute upper-limit available resources of the machine clusters, wherein the preset absolute upper-limit resource utilization rates are greater than preset upper-limit resource utilization rates; and obtaining the coverage ratios of the machine clusters to the terminal groups according to the resource demands of the terminal groups, the absolute upper-limit available resources of the machine clusters, and the access quality.

8. The method according to claim 2, wherein the obtaining the coverage ratios of the machine clusters to the terminal groups according to a preset limiting-condition and the access quality between the terminal groups and the machine clusters specifically comprises:

obtaining the coverage ratios of the machine clusters to the terminal groups according to the resource demands of the terminal groups, the absolute upper-limit available resources of the machine clusters, and the access quality.

9. The method according to claim 1, wherein, after the obtaining coverage ratios of the machine clusters to the terminal groups, the method further comprises:

obtaining, by the scheduling server, the sum of the resource demands of the terminal groups for the machine clusters according to the ratios and the resource demands of the terminal groups;

obtaining, by the scheduling server, a resource difference between the sum of the resource demands and the available resources of the machine clusters; and performing, by the scheduling server according to the resource difference, capacity expansion on the machine clusters.

10. The method according to claim 9, wherein the obtaining, by the scheduling server, coverage ratios of the machine clusters to the terminal groups according to the resource demands of the terminal groups, the available resources of the machine clusters, and the access quality comprises:

processing the resource demands of the terminal groups according to terminal-expected increases corresponding to the terminal groups, to obtain expected resource demands of the terminal groups; and obtaining the coverage ratios of the machine clusters to the terminal groups according to the expected resource demands of the terminal groups, the available resources of the machine clusters, and the access quality.

11. The method according to claim 9, wherein the obtaining, by the scheduling server, coverage ratios of the machine clusters to the terminal groups according to the resource demands of the terminal groups, the available resources of the machine clusters, and the access quality specifically comprises:

processing the available resources of the machine clusters according to preset resource increases of the machine clusters to obtain target available resources of the machine clusters; and obtaining the coverage ratios of the machine clusters to the terminal groups according to the resource demands of the terminal groups, the target available resources of the machine clusters, and the access quality.

12. A terminal access scheduling system, comprising:
a memory storing computer program instructions; and
at least one processor coupled to the memory and, when executing the computer program instructions, configured to perform:
performing grouping on terminals that need access, to obtain multiple terminal groups;
performing cluster division on machines providing resources for access, to obtain multiple machine clusters;
obtaining resource demands of the terminal groups, available resources of the machine clusters, and access quality between the terminal groups and the machine clusters;
obtaining coverage ratios of the machine clusters to the terminal groups according to the resource demands of the terminal groups, the available resources of the machine clusters, and the access quality; and
performing access scheduling for the terminals according to the coverage ratios.

13. The system according to claim 12, wherein the obtaining coverage ratios of the machine clusters to the terminal groups according to the resource demands of the terminal groups, the available resources of the machine clusters, and the access quality comprises:

obtaining the coverage ratios of the machine clusters to the terminal groups according to a preset resource limiting-condition, and the access quality between the terminal groups and the machine clusters, wherein the preset resource limiting-condition comprises: a sum of the resource demands of the terminal groups for the machine clusters is less than or equal to the available resources of the machine clusters, and the sum of the resource demands is obtained according to the resource demands of the terminal groups and the coverage ratios.

14. The system according to claim 13, wherein the obtaining the coverage ratios of the machine clusters to the terminal groups according to a preset resource limiting-condition and the access quality between the terminal groups and the machine clusters comprises:

obtaining a ratio set according to a preset quality limiting-condition, an access quality set, and the preset resource limiting-condition, wherein the access quality set comprises access quality between the multiple terminal groups and the multiple machine clusters, and the ratio set comprises the coverage ratios of the machine clusters to the terminal groups; and the preset quality limiting-condition comprises: a sum of the access quality in the access quality set is maximum.

15. The system according to claim 14, wherein the obtaining a ratio set according to a preset quality limiting-condition, an access quality set, and the preset resource limiting-condition comprises:

creating a corresponding quality matrix according to the access quality set, wherein a matrix element in the quality matrix represents the access quality between the terminal groups and the machine clusters; and obtaining a corresponding weight matrix according to the preset quality limiting-condition, the quality matrix, and the preset resource limiting-condition, wherein a matrix element in the weight matrix represents the coverage ratios of the machine clusters to the terminal groups; and the performing access scheduling on the terminals according to the ratios specifically comprises: performing access scheduling on the terminals according to the weight matrix.

16. The system according to claim 14, wherein the preset quality limiting-condition further comprises: some of the ratios in the ratio set are predetermined ratios.

17. The system according to claim 12, wherein the obtaining coverage ratios of the machine clusters to the terminal groups according to the resource demands of the terminal groups, the available resources of the machine clusters, and the access quality comprises:
- processing the available resources of the machine clusters according to preset upper-limit resource utilization rates of the machine clusters to obtain upper-limit available resources of the machine clusters; and
- obtaining the coverage ratios of the machine clusters to the terminal groups according to the resource demands of the terminal groups, the upper-limit available resources of the machine clusters, and the access quality.

18. The system according to claim 17, wherein the processor is further configured to perform:
- when obtaining of the coverage ratios of the machine clusters to the terminal groups fails, processing the upper-limit available resources of the machine clusters according to preset absolute upper-limit resource utilization rates, to obtain absolute upper-limit available resources of the machine clusters, wherein the preset absolute upper-limit resource utilization rates are greater than preset upper-limit resource utilization rates; and
- obtaining the coverage ratios of the machine clusters to the terminal groups according to the resource demands of the terminal groups, the absolute upper-limit available resources of the machine clusters, and the access quality.

19. The system according to claim 13, wherein the obtaining the coverage ratios of the machine clusters to the terminal groups according to a preset limiting-condition and the access quality between the terminal groups and the machine clusters specifically comprises:
- obtaining the coverage ratios of the machine clusters to the terminal groups according to the resource demands of the terminal groups, the absolute upper-limit available resources of the machine clusters, and the access quality.

20. A non-transitory computer-readable storage medium storing computer program instructions executable by at least one processor to perform:
- performing grouping on terminals that need access, to obtain multiple terminal groups;
- performing cluster division on machines providing resources for access, to obtain multiple machine clusters;
- obtaining resource demands of the terminal groups, available resources of the machine clusters, and access quality between the terminal groups and the machine clusters;
- obtaining coverage ratios of the machine clusters to the terminal groups according to the resource demands of the terminal groups, the available resources of the machine clusters, and the access quality; and
- performing access scheduling for the terminals according to the coverage ratios.

* * * * *